July 17, 1956     K. F. McCANN     2,754,972

INTEGRAL FILTER UNIT

Filed April 5, 1952

INVENTOR.
K. F. McCANN
BY
ATTORNEY

United States Patent Office 2,754,972
Patented July 17, 1956

2,754,972

INTEGRAL FILTER UNIT

Kelly F. McCann, Tulsa, Okla., assignor to Warner Lewis Company, Tulsa, Okla., a corporation of Delaware Application April 5, 1952, Serial No. 280,782

1 Claim. (Cl. 210—169)

This invention relates generally to improvements in filtering devices, and more particularly, but not by way of limitation, to a unitary filter plate and filtering elements.

As it is well known, a vast number of filtering devices in use at the present time contain a filter holding plate having a plurality of tubular shaped filter elements secured thereto. The filter elements are ordinarily removably secured to the filter holding plate with various types of locking devices, some of which are extremely intricate. Therefore, when the filter elements have become clogged or contaminated through extended use of the filtering device, the filter elements are individually disconnected from the filter holding plate for removal from the filtering device. It will be readily seen, therefore, the replacement of a plurality of the filter elements is a time consuming and tedious operation.

The present invention contemplates a filtering device containing a filter holding plate with one or more filter elements permanently secured to the filter holding plate. Thus, when it is desired to replace the filter elements, the entire unit, comprising both the filter holding plate and the filter elements, are simultaneously removed from the filtering device and replaced by a similarly constructed unit. The filter holding plate is formed out of an inexpensive and light weight material to make the replaceable unit economically feasible. Furthermore, it is contemplated to construct the filter holding plate out of a non-corrosive material to preclude contamination of fluids flowing through the filtering device.

An important object of this invention is to facilitate the replacement of filter elements in a filtering device.

Another object of this invention is to provide a novel non-corrosive filter holding plate having a plurality of filter elements permanently secured thereto.

A further object of this invention is to provide a novel method of permanently securing tubular shaped filter elements to a filter holding plate.

A still further object of this invention is to provide a unitary filter unit consisting of a filter holding plate and filter elements which may be economically manufactured.

Other objects and advantages of the invention will be evident from the following detailed description, read in conjunction with the accompanying drawings, which illustrate my invention.

Figure 1:
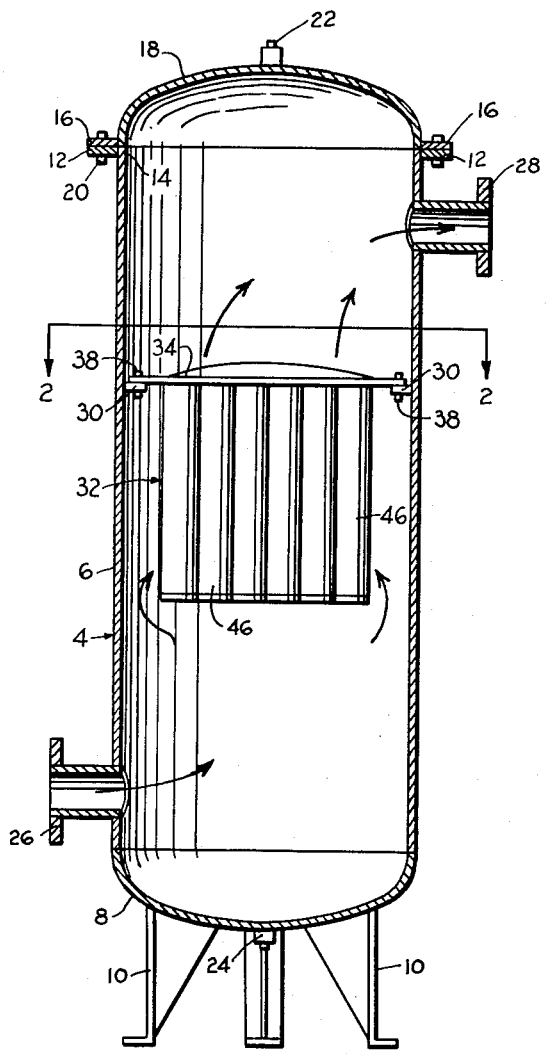
Figure 1 is a vertical sectional view of a filtering device utilizing my novel filter unit.
Figure 2:
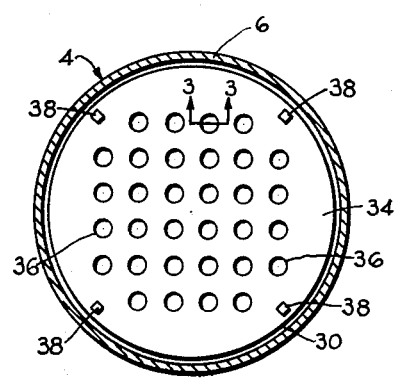
Figure 2 is a cross sectional view taken along lines 2—2 of Fig. 1.

Referring to the drawings in detail, reference character 4 generally designates a filtering device comprising a cylindrical shell 6 permanently enclosed at its lower end 8. The shell 6 is preferably supported in an upright position by suitable supports 10 as shown in Fig. 1. An outwardly extending circumferential flange 12 is provided on the open upper end 14 of the shell 6 to receive a mating flange 16 of a head member 18. The flanges 12 and 16 are interconnected by suitable bolts 20. A vent 22 is provided in the head 18 and a drain connection 24 is provided in the lower end 8 of the shell 6 in a manner well known in the art. Furthermore, a flanged inlet 26 is provided in the lower portion of the shell 6 and a flanged outlet 28 is provided in the upper portion thereof.

An apertured circumferential flange 30 is secured in any suitable manner to the inner periphery of the shell 6 between the inlet 26 and the outlet 28. The flange 30 is adapted to receive and support a novel filtering unit generally indicated at 32. The filter unit 32 comprises a substantially circular filter holding plate 34 having a plurality of spaced apertures 36 therein. The plate 34 is of a size to rest on the flange 30 and is removably secured to the flange 30 by bolts 38. The plate 34 is constructed out of a light weight and non-corrosive material, and preferably plastic (cured resin) re-enforced with glass fibers or the like. The upper surface of the plate 34 may be substantially convex as shown in Fig. 1 to provide added strength for the plate, if desired.

Figure 3:
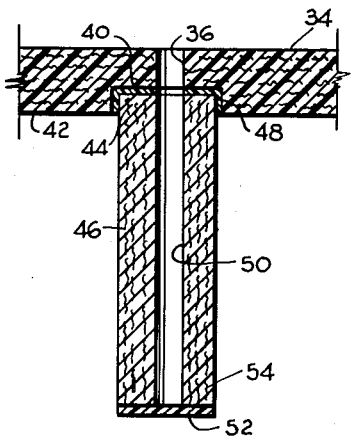
Figure 3 is an enlarged cross sectional view taken along lines 3—3 of Fig. 2.

A counterbore 40 is provided in the lower face 42 of the filter holding plate 34 concentrically around each of the apertures 36 as shown in Fig. 3. Each counterbore 40 is provided to receive the upper end 44 of a tubular shaped filter element 46. The filter elements 46 may be constructed out of any suitable filtering material, such as cotton or pleated paper, for example. The filters 46 are secured in the respective counterbores 40 by a layer of resin 48 in such a manner that the internal bore 50 of each filter element will be in alignment with the respective aperture 36 as will be more fully hereinafter set forth. A cover 52 is provided on the lower end 54 of each filter element 46 to close off the lower end of the respective bore 50. The covers 52 are ordinarily resin impregnated paper disks and are secured to the filter elements 46 by the manufacturer of the filter elements.

In manufacturing my novel filter unit 32, the apertures 36 and counterbores 40 are first drilled or otherwise formed in the plastic (resin impregnated) filter holding plate 34. The resin 48 is then applied in liquid form to the walls and inner end of each counterbore 40. While the resin 48 is still in liquid form, the upper ends 44 of the filter elements 46 are inserted into the respective counterbores 40 as shown in Fig. 3. The entire unit 32 is then placed in an oven (not shown) or the like, whereupon the temperature of the oven is raised to a sufficient degree for curing the resin 48. It will be apparent that a portion of the liquid resin 48 will penetrate into the upper end 44 of the respective filter element 46 and adhere tightly thereto. Furthermore, during the curing operation, the resin 48 will become bonded with the resin impregnated plate 34. Thus, the filter elements 46 will be rigidly and permanently secured to the filter holding plate 34.

In operation of the filtering device 4, the fluid is introduced into the shell 6 through the inlet 26. The fluid will be forced upwardly as indicated by the arrows in Fig. 1 and flow into the filter elements 46 in a radial direction. It will be noted that since the upper end 44 and the lower end 54 of each filter element 46 is blanked or closed off, the fluid will be constrained to flow through the filtering medium of each element. The fluid is gathered in the bore 50 of each filter element 46 and is discharged therefrom through the respective aperture 36 into the upper portion of the shell 6 for subsequent discharge through the outlet 28. A suitable gasket (not shown) may be provided between the filter holding plate 34 and the supporting flange 30 to efficiently seal off the upper and lower portions of the shell 6, if desired.

When the filter elements 46 have been contaminated with an excessive amount of sediment, flow of fluid through the filter device 4 is stopped. The head portion 18 is then removed, whereupon, the filter unit 32 may be removed and replaced with a similar unit. Thus, all of the filter elements 46 may be replaced in a minimum of time with a reduction in the loss of service of the filtering device 4.

From the foregoing, it is apparent that the present invention will facilitate the replacement of the filtering elements of a filtering device. The filter holding plate and the filtering elements are provided as a unitary structure with the filter elements permanently secured to the holding plate. The filter holding plate is constructed of a non-corrosive material, therefore, the unit may be utilized for filtering liquid fuels and the like without fear of contaminating the fuel. It will also be apparent that the present invention provides a novel method of permanently securing filter elements to a filter holding plate.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In combination with a liquid fuel filter apparatus, a re-enforced plastic filter holding plate, said plate having an aperture therethrough, a counterbore provided on one face of the plate concentric with the aperture, said plate being convex on the face opposite that of the first mentioned face, a tubular filter element having a member comprising a cured resin layer permanently bonded to the counterbore for securing the filter element to the plate.

References Cited in the file of this patent

UNITED STATES PATENTS

| | | |
|---|---|---|
| 1,218,738 | Zahm | Mar. 13, 1917 |
| 2,042,564 | Sweetland | June 2, 1936 |
| 2,316,526 | McDonald | Apr. 13, 1943 |
| 2,517,753 | Ximenez et al. | Aug. 8, 1950 |
| 2,525,330 | Zaun | Oct. 10, 1950 |
| 2,537,897 | Hunter | Jan. 9, 1951 |
| 2,559,614 | Hapman | July 10, 1951 |
| 2,571,059 | Puschelberg et al. | Oct. 9, 1951 |
| 2,584,387 | Harvuot | Feb. 5, 1952 |
| 2,592,104 | Arakelian | Apr. 8, 1952 |

FOREIGN PATENTS

| | | |
|---|---|---|
| 5,995 | Great Britain | of 1898 |